(12) United States Patent
Waughtal et al.

(10) Patent No.: US 12,511,634 B2
(45) Date of Patent: Dec. 30, 2025

(54) DUAL NETWORK SYNCHRONIZATION ACROSS POINT-OF-SALE DEVICES LOCATED AT AN EVENT ENVIRONMENT

(71) Applicant: FCS Processing, LLC., Austin, TX (US)

(72) Inventors: Jeff Waughtal, Austin, TX (US); David Avery, Austin, TX (US)

(73) Assignee: FCS Processing, LLC., Austin, TX (US)

( * ) Notice: Subject to any disclaimer, the term of this patent is extended or adjusted under 35 U.S.C. 154(b) by 216 days.

(21) Appl. No.: 18/139,185

(22) Filed: Apr. 25, 2023

(65) Prior Publication Data

US 2024/0362603 A1    Oct. 31, 2024

(51) Int. Cl.
| G06Q 20/20 | (2012.01) |
| G06Q 20/02 | (2012.01) |
| G06Q 20/32 | (2012.01) |

(52) U.S. Cl.
CPC ......... *G06Q 20/202* (2013.01); *G06Q 20/027* (2013.01); *G06Q 20/325* (2013.01)

(58) Field of Classification Search
CPC .. G06Q 20/202; G06Q 20/027; G06Q 20/325; G06Q 20/20; H04W 84/12; H04W 84/18; H04W 24/04; H04W 88/08; H04W 88/12
USPC .......................................................... 705/21
See application file for complete search history.

(56) References Cited

U.S. PATENT DOCUMENTS

| 5,255,182 | A | 10/1993 | Adams |
| 5,532,466 | A | 7/1996 | Konno et al. |
| 6,254,004 | B1 | 7/2001 | Nagao et al. |
| 6,763,336 | B1 | 7/2004 | Kolls |
| 7,349,871 | B2 | 3/2008 | Labrou et al. |
| 7,364,070 | B2 | 4/2008 | Chang |
| 7,774,402 | B2 | 8/2010 | Singh et al. |
| 7,801,826 | B2 | 9/2010 | Labrou et al. |
| 7,941,542 | B2 | 5/2011 | Broda et al. |

(Continued)

FOREIGN PATENT DOCUMENTS

| CA | 2001084779 A1 | 8/2001 |
| CN | 109215255 A | 1/2019 |

OTHER PUBLICATIONS

Bruno, Raffaele et al. Mesh Networks: Commodity Multihop Ad Hoc Networks. IEEE Communications Magazine, 2005. (Year: 2005).*

*Primary Examiner* — Fawaad Haider

(74) *Attorney, Agent, or Firm* — Bryan L. Baysinger; E. Eric Mills; Maynard Nexsen PC

(57) ABSTRACT

Disclosed are various aspects of a dual networked point-of-sale system and methods of data exchange upon network failure. In one aspect, a point-of-sale device is provided that is in communication with a wireless access point. Wherein upon failure of the wireless access point, the point-of-sale device attempts to connect through a mesh network to an additional point-of-sale device to attempt processing a financial transaction. In some aspects, the point-of-sale device heals itself from network failure by utilizing the node to node connection of a mesh network, in other aspects, the event environment becomes a swarm network wherein a plurality of point-of-sale devices interact and communication on both a traditional WLAN and a mesh network, providing network stability and redundancy.

14 Claims, 6 Drawing Sheets

(56) References Cited

U.S. PATENT DOCUMENTS

| | | |
|---|---|---|
| 8,548,859 B2 | 10/2013 | Maltkovic |
| 8,561,884 B2 | 10/2013 | Jimenez Alamo |
| 8,768,838 B1 | 7/2014 | Hoffman |
| 9,558,503 B2 | 1/2017 | Oh et al. |
| 10,607,203 B2 | 3/2020 | Goldberg |
| 10,854,049 B2 | 12/2020 | Waughtal |
| 10,896,425 B2 | 1/2021 | Waughtal |
| 10,990,980 B1 | 4/2021 | Reses et al. |
| 11,361,322 B2 | 6/2022 | Waughtal |
| 2002/0152124 A1 | 10/2002 | Guzman et al. |
| 2004/0128256 A1 | 7/2004 | Krouse et al. |
| 2005/0086286 A1 | 4/2005 | Gatto et al. |
| 2005/0086360 A1 | 4/2005 | Mamou et al. |
| 2007/0188749 A1 | 8/2007 | Brady et al. |
| 2007/0233603 A1 | 10/2007 | Schmidgall et al. |
| 2008/0051059 A1 | 2/2008 | Fisher |
| 2008/0147495 A1 | 6/2008 | Bal et al. |
| 2008/0270301 A1 | 10/2008 | Jones et al. |
| 2010/0051689 A1 | 3/2010 | Diamond |
| 2011/0276636 A1 | 11/2011 | Cheng et al. |
| 2013/0263008 A1 | 10/2013 | Bylahall et al. |
| 2013/0317928 A1 | 11/2013 | Laracey |
| 2015/0120666 A1 | 4/2015 | Otsuka |
| 2016/0086161 A1 | 3/2016 | Zhou et al. |
| 2016/0321661 A1 | 11/2016 | Hammond et al. |
| 2020/0074437 A1* | 3/2020 | Bonsi .................. G06Q 20/326 |
| 2020/0160311 A1* | 5/2020 | Vick .................... G06Q 20/208 |
| 2020/0352013 A1* | 11/2020 | Hutson ................ H05B 47/19 |

* cited by examiner

DUAL NETWORK SYNCHRONIZATION ACROSS POINT-OF-SALE DEVICES LOCATED AT AN EVENT ENVIRONMENT

CROSS-REFERENCE TO RELATED APPLICATIONS

The present application is being co-filed with U.S. application Ser. No. 18/139,102, titled Edge Network Monitoring and Adaptation Systems; U.S. application Ser. No. 18/139,153, titled A Unified Controller System for Point-of-Sale Devices; and U.S. application Ser. No. 18/139,201, titled Dual Network Implemented Method of a Customer Relationship Management and Point of Sale Merchandising System for Patron Experience, the contents of which are incorporated by reference herein in their entirety.

FIELD

The present application is in the field of communications networking and point-of-sale devices. More particular, the present application is directed to systems and methods of dual networked connectivity, including energy efficient low bandwidth and low frequency communications between mesh networked point-of-sale devices.

BACKGROUND

A point-of-sale ("POS") device, also known as a point-of-sale terminal or register, is an electronic system used in retail stores, businesses, and at remote events to process transactions. POS devices typically comprise a combination of hardware and software that allows customers to purchase goods and services by swiping their credit or debit cards, using mobile payments, touchless payments, or paying in cash.

POS devices most often comprise components such as a display (LED, LCD, etc), a computing unit, a scanner, a chip-card reader, a swipe-card reader, near field communications, and in some instances a cash drawer, and a receipt printer. The software running on POS devices is responsible for managing inventory, generating sales reports, processing payments, accumulating point-of-sale data, presenting a user interface, and other essential retail functions.

A peer-to-peer (P2P) mesh network, commonly referred to as mesh network, is a type of network in which all nodes (also known as peers) can act as both clients and servers. Each node is responsible for relaying data between other nodes in the network. In a P2P mesh network, there is no central server or routing infrastructure. Nodes communicate directly with each other to transmit data, and each node can discover the most efficient route to send data to its destination.

The mesh topology of a P2P network provides redundancy and robustness. The availability of multiple paths can be used to transmit data if one path fails. This means that P2P mesh networks are often used in situations where a traditional centralized network may not be feasible or reliable, such as in disaster areas or rural communities. P2P mesh networks can be formed using wireless communication technologies and protocols such as Wi-Fi, Bluetooth, Digimesh, and Zigbee. The various networks can also be implemented using software-defined networks (SDNs), which can customize the architecture based on the software running on the devices.

Overall, mesh networks offer a decentralized and resilient approach to networking, enabling efficient communication and data transfer among a large number of nodes, without relying on a centralized infrastructure. A common problem with utilizing point-of-sale devices within event environments is the uncertain and intermittent nature of edge network communications. For example, weather may impede signals, or temporary structures, or wireless signals may compete across similar spectrum. Even further, wireless equipment may fail, or become unplugged from electric power. Hardware failure, such as an access point failure, is common and often leads to entire sections of an event becoming unable to process transactions or function in a sales role. Resulting in an economic loss, and customer dissatisfaction.

Despite the often harsh conditions, Point-of-sale devices need to be ready to process payment transactions or otherwise suffer economic loss and reputational harm. Thus, there is a long sought need to create a resilient network model that can be done so in an energy efficient matter, wherein the point-of-sale devices may be able to process transactions through a node to node connection, when a given access point fails. Furthermore, there is also a need to transmit and reconcile data across devices, without the use of large computing resources, electric power, or the need for large data packets, the disclosure herein aims to address these issues and provide solutions thereto.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

In some aspects, the techniques described herein relate to a dual networked point-of-sale system for operating in event environments, including: a plurality of point-of-sale devices, each point-of-sale device including a computing device, a payment device, and a wireless network module, integrated within a shell; a wireless local area network, including: (i) a first access point in wireless communication with a first point-of-sale device from of the plurality of point-of-sale devices; (ii) a second access point in wireless communication with a second point-of-sale device from the plurality of point-of-sale devices; (iii) a gateway in wired or wireless communication with the first access point and the second access point that allows the first point-of-sale device and the second point-of-sale device to communicate with a financial institution; and a mesh network, including: (i) each of the plurality of point-of-sale devices forming a node, and wherein upon a failure of the first access point initiates the first point-of-sale device to attempt a connection through the wireless network module to the gateway through the wireless network module on the second point-of-sale device that is in communication with the second access point.

In some aspects, the techniques described herein relate to a system, wherein bandwidth on each of the wireless network modules is a 900 MHz frequency band, ranging from 902 MHz to 928 MHz.

In some aspects, the techniques described herein relate to a system, wherein frequencies on each of the wireless network modules could operate on any of ISM band frequencies of 4.33 GHz, 915 MHz, 2.4 GHz to 5 GHz.

In some aspects, the techniques described herein relate to a system, wherein the shell is a polymeric shell with IP55 water resistance and dust resistance.

In some aspects, the techniques described herein relate to a system, further including a plurality of access points.

In some aspects, the techniques described herein relate to a system, further including a software application in memory on the each of the plurality of point-of-sale devices.

In some aspects, the techniques described herein relate to a system, wherein the software application includes instructions for transmitting a financial transaction through the mesh network to the financial institution for clearing the financial transaction.

In some aspects, the techniques described herein relate to a system, wherein the software application further maintains a data repository of sponsor funds, and settles the sponsor funds through the mesh network.

In some aspects, the techniques described herein relate to a dual networked point-of-sale method for operating at an event environment, including: providing a plurality of point-of-sale devices, each point-of-sale device including a computing device, a payment device, and a wireless network module, integrated within a shell; establishing a wireless local area network at an event environment, including: (i) a first access point in wireless communication with a first point-of-sale device from of the plurality of point-of-sale devices; (ii) a second access point in wireless communication with a second point-of-sale device from the plurality of point-of-sale devices; (iii) a gateway in wired or wireless communication with the first access point and the second access point that allows the first point-of-sale device and the second point-of-sale device to communicate with a financial institution; and establishing a mesh network at the event environment, including: (i) each of the plurality of point-of-sale devices forming a node, and wherein upon a failure of the first access point initiates the first point-of-sale device to attempt a connection through the wireless network module to the gateway through the wireless network module on the second point-of-sale device that is in communication with the second access point.

In some aspects, the techniques described herein relate to a method, wherein bandwidth on each of the wireless network modules is a 900 MHz frequency band, ranging from 902 MHz to 928 MHz.

In some aspects, the techniques described herein relate to a method, wherein frequencies on each of the wireless network modules could operate on any of ISM band frequencies of 4.33 GHz, 915 MHz, 2.4 GHz to 5 GHz.

In some aspects, the techniques described herein relate to a method, wherein the shell is a polymeric shell with IP55 water resistance and dust resistance.

In some aspects, the techniques described herein relate to a method, further including providing a plurality of access points.

In some aspects, the techniques described herein relate to a method, further including installing a software application in memory on the each of the plurality of point-of-sale devices.

In some aspects, the techniques described herein relate to a method, wherein the software application includes instructions for transmitting a financial transaction through the mesh network to the financial institution for clearing the financial transaction.

In some aspects, the techniques described herein relate to a method, wherein the software application further maintains a data repository of sponsor funds, and settles the sponsor funds through the mesh network.

In some aspects, the techniques described herein relate to a method for clearing a financial transaction at an event environment when an access point fails, including: providing a first point-of-sale device wirelessly connected to a first access point, wherein the first access point is in connection to an external network; providing a second point-of-sale device wirelessly connected to a second access point, wherein the second access point is in connection to the external network; attempting a financial transaction request on the first point-of-sale device, wherein attempting transmits financial transaction data payload to the first access point connected to the external network that is in communication with a financial institution; receiving a failure or no response to the financial transaction; connecting through a mesh network to the second point-of-sale device, wherein the second point-of-sale network has connection to the external network through the second access point; and processing the financial transaction request by transmitting the financial transaction data payload through the first point-of-sale device to the second point-of-sale device, wherein the second point-of-sale device transmits the financial transaction data payload through the second access point to the financial institution.

In some aspects, the techniques described herein relate to a method, further including receiving by the second point-of-sale device from the financial institution, approval of the financial transaction request;

In some aspects, the techniques described herein relate to a method, further including providing a third point-of-sale device wirelessly connected to a third access point, wherein the third access point is in connection to the external network;

In some aspects, the techniques described herein relate to a method, further including processing the financial transaction request by transmitting the financial transaction data payload through the first point-of-sale device to the second point-of-sale device, and then to the third point-of-sale device, wherein the third point-of-sale device transmits the financial transaction data payload through the third access point to the financial institution.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. Therefore, in the drawings.

DETAILED DESCRIPTION

Figure 1:
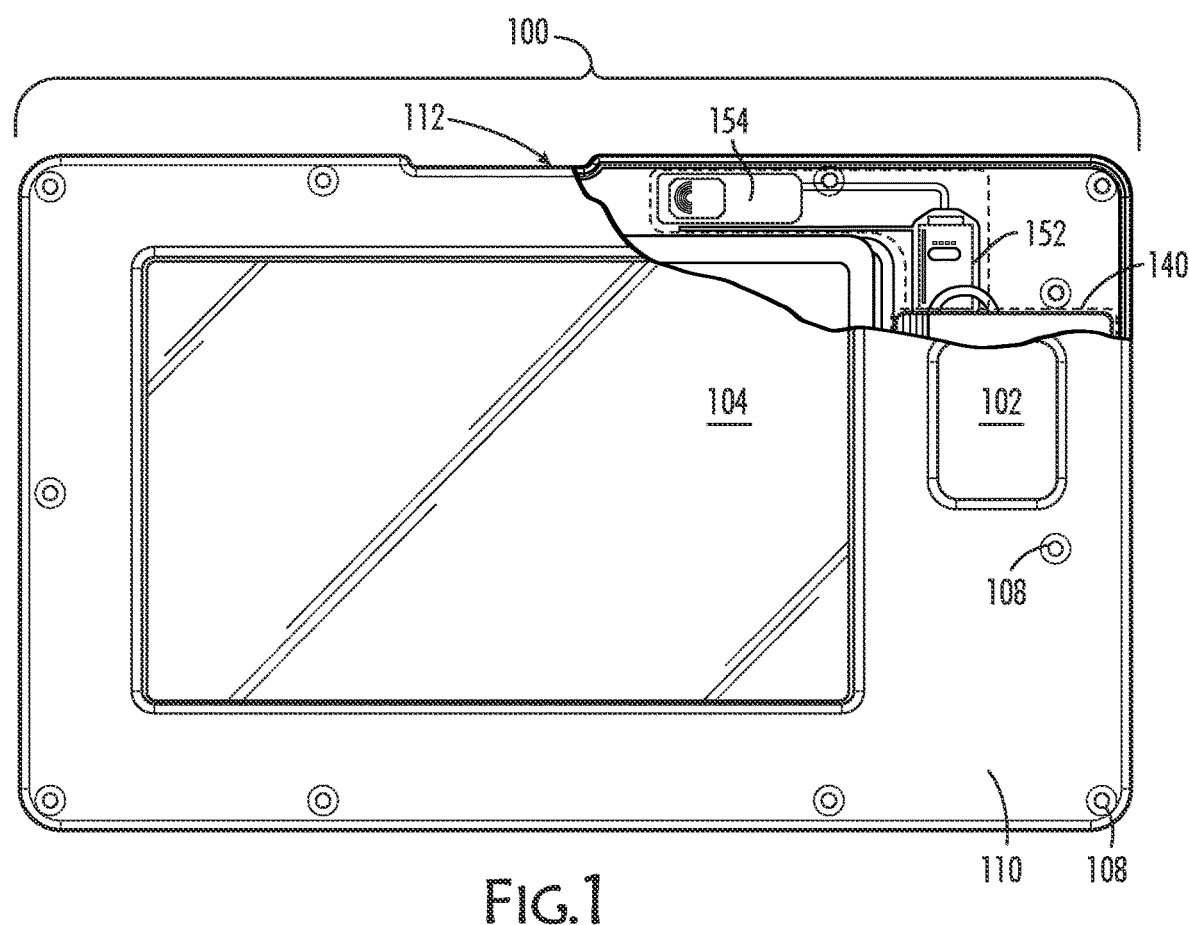
FIG. 1 is a front perspective view illustration of an example point-of-sale device as disclosed herein.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

I. Hardware Aspects

In some aspects, the disclosure herein relates to a point-of-sale system for operating in event environments. A point-of-sale system may include a computing device such as a mobile phone, tablet computer, or other computing device that is capable of executing software, such as an operating system equipped with enough memory to store instructions for executing a customer relationship management application ("CRM"). Further, an application may include vendor store fronts, process sales transactions, and connect to a business intelligence suite. Example computing devices include devices with processing circuitry, memory circuitry, and communications circuitry, to name a few components.

In one aspect the computing device is encased in a weather resistant polymeric shell. The weather resistant polymeric shell is designed with a rubber inner seal around entryways to provide international standard EN 60529 and IEC 60529 IP rating 55 and above. The weather resistant polymeric shell may also comprise an adhesive to help seal, or a lubricant applied to an inner rubber seal for preservation and longevity of the weather resistance. Further, the weather resistant shell may be comprised of a polymeric material, and may also be embedded with rubber on the edges or metal may be introduced within the polymeric shell for rigidity. Weather resistance also includes resistance to dust, through baffles and the rubber inner seal. Such resistance to dust also allows for heat dissipation through the baffles. Further, the weather resistant shell may be made out of colors that display higher reflection of unwanted solar radiation. The weather resistant shell benefits from being 1) Lightweight: the weather resistant shell is lightweight, which reduces the overall weight of the device. This is important for portable point-of-sale devices, such as smartphones, tablets, and laptops; 2) Durability: the weather resistant shell is highly durable and can withstand a range of environmental conditions, such as temperature changes, humidity, and exposure to water or chemicals. This helps protect the electronic components inside from damage; 3) Insulation: the weather resistant shell provides electrical insulation, which helps prevent short-circuits and other electrical problems; 4) Cost-effective: the weather resistant shell is often less expensive to manufacture than other materials, such as metal or glass. This makes the design a cost-effective option for protecting the electrical components, such as the computing device and controller board.

A computing device, such as a tablet computing device within a point-of-sale device, as understood from this disclosure, includes a processor and a memory that communicate with each other, and with other components, via a bus. A bus can include any of several types of bus structures including, but not limited to, a memory bus, a memory controller, a peripheral bus, a local bus, and any combinations thereof, using any of a variety of bus architectures.

Memory can include various components (e.g., machine-readable media) including, but not limited to, a random-access memory component, a read-only component, and any combinations thereof. In one example, a basic input/output system (BIOS), including basic routines that help to transfer information between elements within computer system, such as during start-up, can be stored in memory. Memory can also include (e.g., stored on one or more machine-readable media) instructions (e.g., software) embodying any one or more of the aspects and/or methodologies of the present disclosure. In another example, memory can further include any number of program modules including, but not limited to, an operating system, one or more application programs, other program modules, program data, and any combinations thereof.

Point-of-sale devices, computing devices, can also include a storage device. Examples of storage devices include, but are not limited to, a hard disk drive, a magnetic disk drive, an optical disc drive in combination with an optical medium, a solid-state memory device, and any combinations thereof. Storage device can be connected to bus by an appropriate interface. Example interfaces include, but are not limited to, SCSI, advanced technology attachment (ATA), serial ATA, universal serial bus (USB), IEEE 1394 (FIREWIRE), and any combinations thereof. In one example, a storage device (or one or more components thereof) can be removably interfaced with the point-of-sale device (e.g., via an external port connector). Particularly, a storage device and an associated machine-readable medium can provide nonvolatile and/or volatile storage of machine-readable instructions, data structures, program modules, and/or other data for the point-of-sale device. In one example, instructions can reside, completely or partially, within machine-readable medium. In another example, instructions can reside, completely or partially, within processor.

A user may also input commands and/or other information to the point-of-sale device via a storage device (e.g., a removable disk drive, a flash drive, etc.) and/or network interface device. A network interface device, such as network interface device, can be utilized for connecting the point-of-sale device to one or more of a variety of networks, and one or more remote devices connected thereto. Examples of a network interface device include, but are not limited to, a network interface card (e.g., a mobile network interface card, a LAN card), a modem, a wireless module, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices (mesh network), and any combinations thereof. A network, generally speaking, can employ a wired and/or a wireless mode of communication. In general, any network topology can be used.

II. Software and Network Topology

Software-Defined Networking (SDN) is an approach to networking that separates the control plane (which determines how traffic is routed) from the data plane (which forwards packets). This separation allows network administrators to manage network behavior through software-based controllers, rather than through physical hardware devices. SDN enables more flexible, efficient, and cost-effective management of network infrastructure by centralizing control of network functions and automating network management. With SDN, network administrators can easily allocate network resources, prioritize traffic, and monitor network performance in real-time. SDN is implemented using a combination of hardware and software technologies, including programmable network switches, wireless access points (routers, gateways), network controllers, and network virtualization software. These components work together to enable network administrators to create logical networks that can be customized to meet the specific needs of their organization. SDN allows for the ability to automate network management tasks, which can significantly reduce the workload for network administrators. For example, SDN can be used to automatically configure network policies, adjust network bandwidth, and optimize network performance based on real-time traffic patterns. Further, SDN networks may diagnose congestion, shift resources, and perform optimization, of which may increase service and reliability from point-of-sale devices in event environments.

In one aspect a Wireless Local Area Network (WLAN) is utilized to provide Internet communications and connectivity to the point-of-sale devices. WLAN is a type of network that allows devices to connect and communicate with each other wirelessly using radio waves instead of cables. In a WLAN, point-of-sale devices connect to a wireless access point (WAP) that is connected to a wired network. The WAP acts as a bridge between the wireless and wired networks, allowing devices to communicate with each other and access resources such as printers and file servers. WLANs can be set up using different wireless technologies, such as Wi-Fi, Bluetooth™, or Zigbee™. Wi-Fi is the most commonly used wireless technology for WLANs, and it operates on a set of standards defined by the IEEE 802.11 protocol. Wi-Fi allows devices to connect to a network over a range of several meters to several hundred meters, depending on the strength of the wireless signal and any obstacles that may be present.

In another aspect, a mesh network is disclosed. A mesh network is a type of network topology in which each node (or point-of-sale device) in the network is connected to multiple other nodes (point-of-sale devices), rather than relying on a single centralized hub. This allows for more efficient and reliable communication between devices, as each device can act as a relay for other devices in the network. In a mesh network, each node is responsible for routing data to its destination. If one node fails or becomes disconnected, the network can automatically reroute data through other nodes to reach its destination, ensuring that the network remains functional even if individual nodes fail. Mesh networks can be one solution in situations where traditional networks may be impractical or unreliable, such as in large event environments (festivals, arenas, large outdoor gatherings) or in disaster situations where traditional communication infrastructure has been damaged or destroyed. Further, mesh networks may be utilized to form an Internet of Things (IoT) between various other hardware and software embodiments at an event environment. Wherein the devices need to communicate with each other without relying on a centralized hub. A key advantage of mesh networks is their scalability, and various aspects of the scalability are disclosed herein. Namely, each node in the network can act as a relay, the network can easily be expanded by adding more nodes, without the need for a centralized infrastructure.

III. Referring to the Figures

Referring now to FIG. 1, a front view illustration of an example point-of-sale device 100. According to example embodiments disclosed herein, the point-of-sale device is comprised of a tablet computing device 104, which is configured with processing circuitry, memory circuitry and communications circuitry. The tablet computing device 104 is connected via a cable to the payment device 102, wherein the payment device is configured to accept payment. Examples of payment are through near field communications, such as an RFID enabled payment vehicle (bracelet, card, object), or through a chip card or a swipe card. Examples of payment devices that may be incorporated herein is the bbPOS Chipper™ https://stripe.com/docs/terminal/readers/bbpos-chipper2xbt the scope of which is referenced herein in the entirety.

In one aspect the point-of-sale device 100 is encased in a weather resistant polymeric shell. The weather resistant shell is designed with a rubber inner seal around entryways to provide international standard EN 60529 and IEC 60529 IP rating 55 and above. The weather resistant polymeric shell 110 is typically comprised of two pieces, a top piece and a bottom piece, windows for viewing and RF communications, and void regions defined within the interior for accepting the computing device (tablet computer, mobile computer, smartphone) and peripherals (payment device 102, wireless module 152, power module, controller board). Further, the weather resistant polymeric shell 110 is held together by fasteners 108, which may comprise screws, bolts, or other elements to compress an inner seal to provide the weather resistant aspects. The weather resistant shell 110 may also comprise an adhesive to help seal, or a lubricant applied to an inner rubber seal for preservation and longevity of the weather resistance. Further, the weather resistant shell may be comprised of a polymeric material, and may also be embedded with rubber on the edges or metal may be introduced within the polymeric shell for rigidity. Weather resistance also includes resistance to dust, through baffles and the rubber inner seal. Such resistance to dust also allows for heat dissipation through the baffles. Further, the weather resistant shell may be made out of colors that display higher reflection of unwanted solar radiation. The weather resistant shell benefits from being 1) Lightweight: the weather resistant shell is lightweight, which reduces the overall weight of the device. This is important for portable point-of-sale devices, such as smartphones, tablets, and laptops; 2) Durability: the weather resistant shell is highly durable and can withstand a range of environmental conditions, such as temperature changes, humidity, and exposure to water or chemicals. This helps protect the electronic components inside from damage; 3) Insulation: the weather resistant shell provides electrical insulation, which helps prevent short-circuits and other electrical problems; 4) Cost-effective: the weather resistant shell is often less expensive to manufacture than other materials, such as metal or glass. This makes the design a cost-effective option for protecting the electrical components, such as the computing device and controller board.

As depicted in FIG. 1, the display of the computing device 104 is positioned within a window in the weather resistant polymeric shell 110, wherein the display may further comprise additional shielding or a glare reducing layer. In this aspect, the payment device 102 in encased within the weather resistant polymeric shell, and a portion is external through a window to allow for financial transactions. In an additional aspect there may be a radio transmission window 512 of non-radio frequency interfering material, such as a thin plastic shroud, that allows for an antenna to be located beneath, or for NFC communications.

Continuing, a wireless network module 152 is disclosed and connected to an antenna 154. Example wireless network modules 152 for communicating across a mesh network topology include the DigiMesh™ Digi XBee SX 900 RF Module, Sierra Wireless™ LPWA Modules, and Sierra Wireless™ Smart Modules such as the EM919X series, to name a few. Additional wireless modules may be employed, and will be recognized by those of skill in the art. In one aspect, the wireless module is selected to perform optimally on low power and through a congested network. Further, the functional amount of data transferred across the mesh network is often low, thus embodiments that are configured for low power and low bandwidth perform optimally for event environments. However, many other network aspects may be employed, such as the 2.4 GHz band, the 5 GHz band, as well as cellular communications bands, to name a few. Further, certain aspects may include frequencies on each of the wireless network modules could operate on any of ISM band frequencies of 4.33 GHz, 915 MHz, 2.4 GHz to 5 GHz. In a preferred aspect for event environments, a low frequency, low bandwidth 900 MHz network is established on a mesh network topology, wherein each of the plurality of point-of-devices is capable of receiving and transmitting information, and thus the point-of-sale devices take physical operation as each serves as a wireless access point. This is depicted even further in the figures, and aspects of network adaptability are key components of the disclosure herein.

In one aspect, broadcasting on a mesh network refers to the process of sending a message from one point-of-sale device (node) to all other point-of-sale devices (nodes) in the network. In an example mesh network, point-of-sale devices are connected to each other in a decentralized manner, forming a mesh-like topology. This allows for efficient routing of data packets between the point-of-sale devices, as the network can automatically find the best path between the sender and the receiver. When a point-of-sale device wants to broadcast a message, it sends the message to all its neighbors, who in turn forward the message to their own neighbors, until the message has been received by all point-of-sale devices in the network. The propagation of the message can be optimized by using various techniques such as flooding control and adaptive forwarding, which prevent the message from being forwarded unnecessarily and reduce network congestion. Broadcasting on a mesh network can also result in a number of challenges. One of the main challenges is resolving propagation issues, such as collisions and message loss. In one aspect, the point-of-sale devices are configured to repeat a specific number of times, prior to ending the forward. Collisions occur when multiple point-of-sale devices try to broadcast messages simultaneously, causing interference and potentially corrupting the messages. Message loss occurs when a point-of-sale device fails to receive a broadcasted message due to network congestion or other reasons. To resolve propagation issues, mesh networks may use various mechanisms such as collision avoidance techniques like Carrier Sense Multiple Access with Collision Avoidance (CSMA/CA), which helps prevent collisions by ensuring that nodes wait for a clear channel before broadcasting a message. Additionally, retransmission mechanisms can be used to ensure that lost messages are retransmitted until they are successfully received.

As will be apparent from the systems and methods disclosed herein, many aspects and networking protocols may be employed to build resiliency in payment processing and the collecting of business intelligence. In one aspect, the point-of-sale device is configured with a Low-Power Wide-Area ("LPWA") network module, wherein the point-of-sale devices form nodes, with the goal of positioning the point of sale devices so that at least one unit is within an active connection to the Internet so as to reach a financial institution to verify credit, or to resolve a ledger of credits, and to further collect business intelligence. In this aspect, one point-of-sale device may be positioned to communicate with a cellular network, in other embodiments it may be a wireless access point, and in other embodiments it may be to a local server that is connected through a LAN to the Internet. In all aspects, the point-of-sale devices, through the network module, become a swarm network and allow for resiliency when the traditional WLAN network integrated within the computing device fails.

Figure 2:
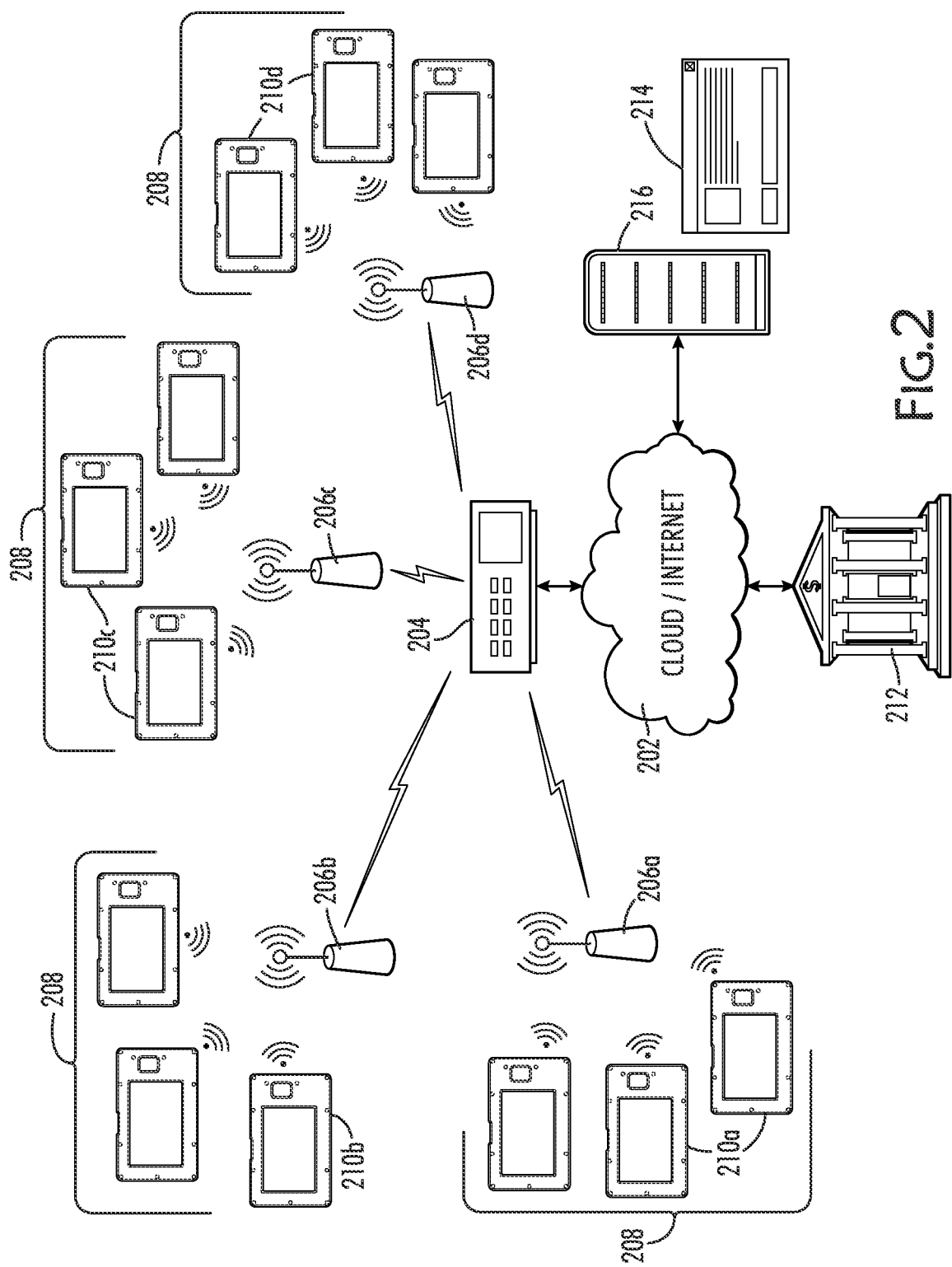
FIG. 2 is an illustration of an example WLAN network connected to a plurality of point-of-sale devices.

Referring now to FIG. 2, an illustration of an example WLAN network connected to a plurality of point-of-sale devices. This aspect discloses a traditional networking connection of a plurality of devices at an event through a WLAN. In this aspect, the event environment is broken into several event spaces 208, wherein event spaces may be different vendor locations spread across an event environment. Such as vendor stations set up across a music festival, sporting event, or other outdoor commercial environment. The plurality of point-of-sale devices 210, are connected to a plurality of access points 206, and each are spread throughout the event environment. The access points 206 are connected through wired or wireless connection to a modem 204, or other network device, such as a switch, and then connected to a modem 204 that has established communication with the Internet 202. As disclosed previously, the point-of-sale devices operate through a customer relationship management (CRM) application, in which the CRM application further houses the payment applications, along with business information functionality.

Continuing, the WLAN model in FIG. 2, connects to the internet and then to the various financial institutions 212 of the payment vehicles in which patrons are utilizing. For example, if a customer presents a Bank of America™ card, the point-of-sale device will process the transaction by settling the requested amount with the patron's payment issuing financial institution. Often times this is resolved by an intermediary, it will be known to those of skill in the art the settling of a balance on a payment vehicle, such as a credit card, or other payment device. This includes settling of a ledger or other sponsor funds associated with, for example, an RFID wristband or other RFID enabled device that stores a unique frequency or serial that is associated with a user's funds.

In one aspect, processing a financial transaction on a point-of-sale device comprises receiving payment information (payment vehicle) from a purchaser at a merchant/vendor site. Then the transaction details, such as the amount at issue, the payment vehicle information, and the settling account are transmitted to an issuing financial institution. The issuing financial institution approves or declines, and transmits back to a payment processor, or to the point-of-sale device. There are many avenues that the financial transaction data may take, including various registries, payment processors, or clearing houses, regardless of the pathway the point-of-sale devices must be able to maintain a stable and reliable connection to the Internet and external servers to allow for payment processing. Thus, the dual network disclosure herein provides redundancy, as well as allows a unique set of design parameters that allow the point-of-sale devices to process transactions across a remote environment.

Continuing, the mesh network in the dual network disclosure provides the ability to also collect business intelligence, and to synchronize a ledger of funds, such as sponsor funds that may be preloaded prior to an event. In this aspect, the mesh network, comprised of low frequency low bandwidth wireless modules (900 MHz), are designed to be compact, and for reduced power draw (typically less than 1 watt), are configured within each of the plurality of point-of-sale devices. Therefore, when one access point fails, the mesh network may trigger, in which a propagated financial transaction request may reach a second point-of-sale device that has a stable connection to a second access point, allowing for the financial transaction to complete. In other aspects, the network may be cellular, and may broadcast on 2G spectrum, such as 850, 900, 1800, and 1900 MHz spectrum.

Figure 3:
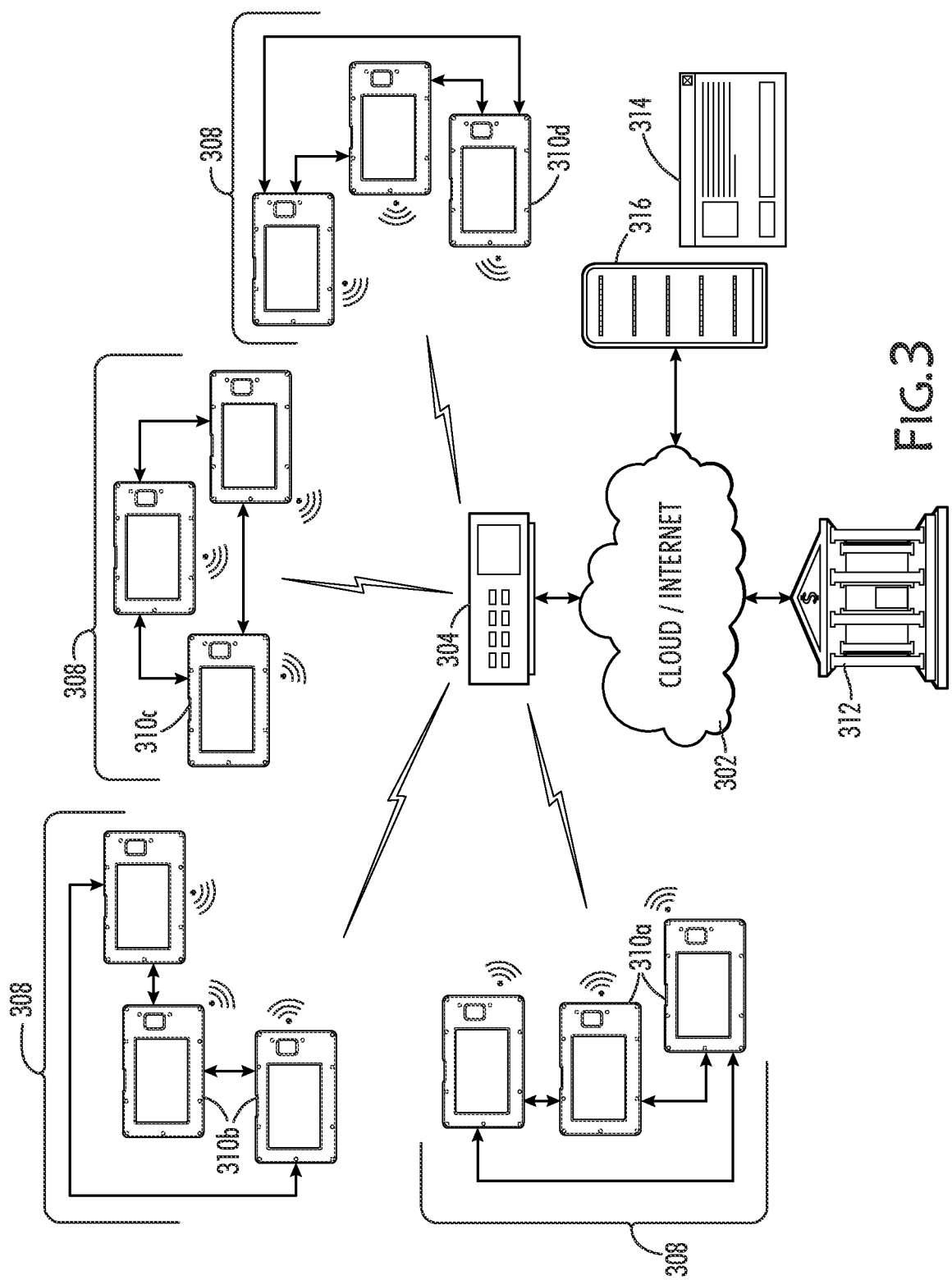
FIG. 3 is an illustration of an example mesh network across a plurality of point-of-sale devices.

Referring now to FIG. 3, an illustration of an example mesh network across a plurality of point-of-sale devices at an event environment. In this aspect, the point-of-sale devices 610 comprise an additional onboard wireless module configured to operate with onboard parameters, wherein the wireless module is provided within a void region, and secured safely within the polymeric shell. In this aspect, the wireless module operates on a low bandwidth, low frequency, chipset that allows reduced power draw and strong performance within limited ranges, for example up to 10,000 feet. The onboard wireless module allows for a mesh connection across the plurality of point-of-sale devices, therein providing redundancy and allowing for additional data transfer, removed from the traditional WLAN network. As such, the mesh network, in some aspects, may be able to transmit and synchronize sponsor funds on a local ledger or database, in which funds may be reconciled without the need for an external facing connection. In this aspect, sponsor funds would be preloaded onto the devices, and the mesh network would synchronize transactions to ratify a balance. Further, the mesh network may operate with a level of encryption that is PCI DSS compliant, including 256-bit AES encryption on transferred data packets.

Continuing, in the example of FIG. 3, the mesh network connects to a plurality of vendor zones 308, that are located across an event environment. The vendor zones 308 each comprise a plurality of point-of-sale devices 310 to process various transactions, such as food and beverage, or merchandise transactions. The point-of-sale devices 310 each form a node, and are configured to send and receive instructions, thereby allowing a propagation of a request throughout the plurality of point-of-sale devices. As discussed previously, this mesh architecture allows for a P2P network, wherein any one failure may be overcome by propagating instructions to a neighbor that has an established Internet connection. In doing so the network becomes resilient against faults, and allows financial transactions to complete in the harshest of environments.

The gateway or modem 304 is then connected to, typically through a switch or other network hardware, the plurality of point-of-sale devices. Wherein the connection is based on a node to node mesh environment, thus the nearest point-of-sale device may establish the connection to the cloud/internet 302. In any event, through the mesh environment a connection is made to an outside financial institution 312, or to another credit processor, thus allowing the processing of financial transactions on a low frequency low bandwidth mesh network, hosted on point-of-sale devices, spread throughout an event environment.

Figure 4:
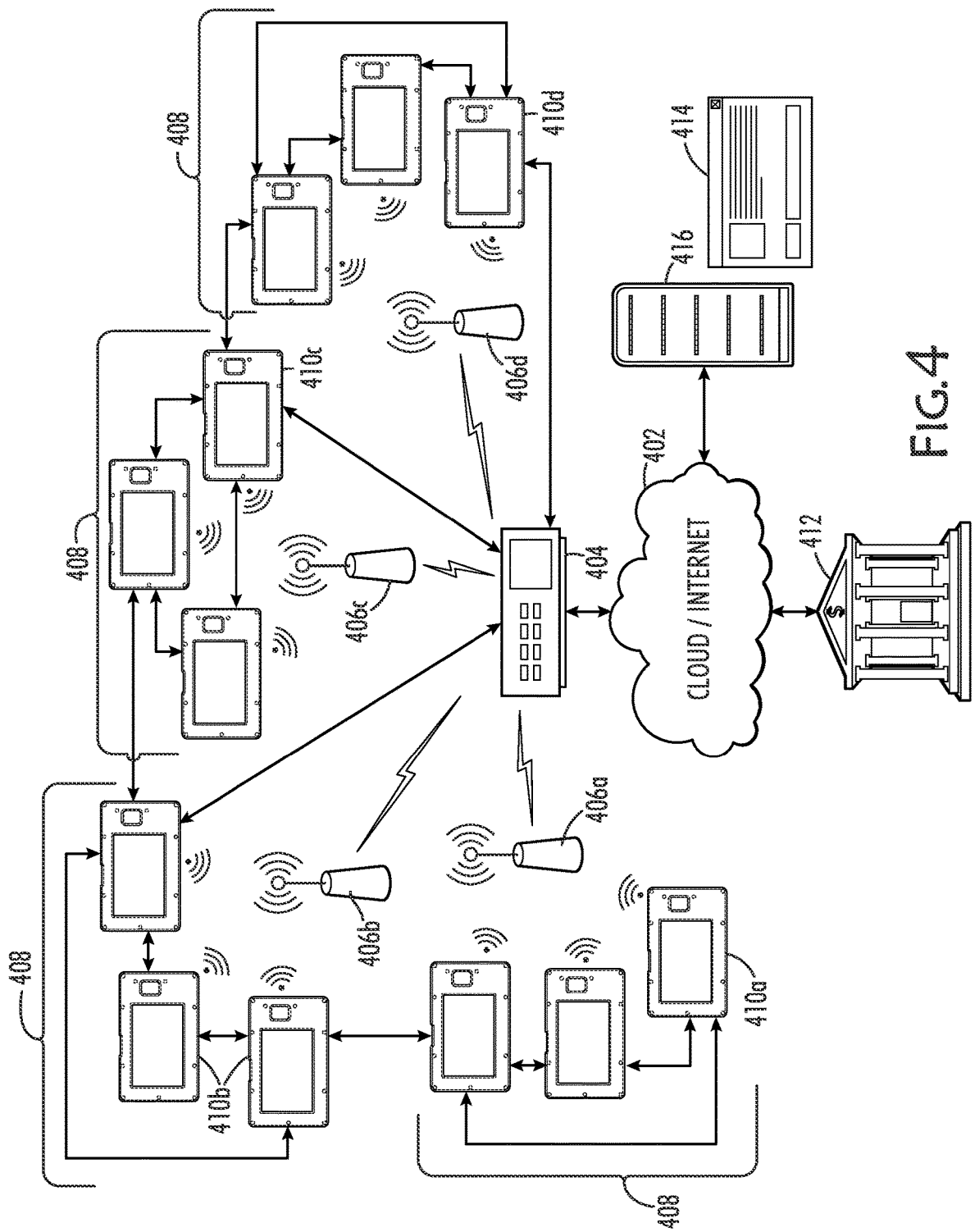
FIG. 4 is an illustration of an example mesh network and WLAN network connected to a plurality of point-of-sale devices.

Referring now to FIG. 4 an illustration of an example mesh network and WLAN network (dual network) connected to a plurality of point-of-sale devices. This aspect comprises a dual network configuration, wherein the WLAN network, enabled by the wireless module onboard the computing device, provides a wireless connection (2.4 GHz, 5 GHz, etc.) to a wireless access point, or simply an access point. In this aspect, a dual networked point-of-sale system for operating in event environments is disclosed. Wherein a plurality of point-of-sale devices, each point-of-sale device comprising a computing device, a payment device, and a wireless network module, integrated within a shell. The integration may be within void regions, recesses, gaps, and other configurations within the shell that allows the peripheral components to be protected from elements at an event environment. In one aspect, referring to FIG. 4, a wireless local area network is disclosed, the WLAN network comprising a first access point 406a in wireless communication with a first point-of-sale device 410a. The WLAN network also comprising a second access point 406b in wireless communication with a second point-of-sale device 410b from the plurality of point-of-sale devices. As depicted there can be any number of access points connected to point-of-sale devices, and the number is determined by the network spread, and reach of a WLAN configuration, along with the number of point-of-sale devices connected.

Continuing, in FIG. 4 a gateway and switch 404 is in wired or wireless communication with the first access point 406a and the second access point 406b, that allows the first point-of-sale device 410a and the second point-of-sale device 410b to communicate with a financial institution 412. Additionally, FIG. 4 comprises a second network, a mesh network. Wherein the mesh network comprises each of the plurality of point-of-sale devices 410 forming a node, and wherein upon a failure of the first access point 406a initiates the first point-of-sale device to attempt a connection through the wireless network module to the gateway through the wireless network module on the second point-of-sale device that is in communication with the second access point. This builds in the resiliency by allowing the mesh network to operate to "search and find" an access point, or cellular tower to connect out of the network.

Continuing with FIG. 4, further disclosed is a dual networked point-of-sale method for operating at an event environment. In this aspect the event environment is provided with a plurality of point-of-sale devices 410 at separate event locations or spaces 408, each point-of-sale device comprising a computing device, a payment device, and a wireless network module, integrated within a shell. In the method the next step is establishing a WLAN at an event environment. This occurs through the first access point 406a in wireless communication with a first point-of-sale device 410a. It further continues by connecting subsequent point-of-sale devices to near access points to establish a WLAN network. The WLAN network is connected to a modem in wired or wireless communication. The network connection allows the first access point and the second access point to communicate with a financial institution, through the modem.

The method of FIG. 4 further comprises establishing a mesh network at the event environment. The mesh network comprises each of the plurality of point-of-sale devices 410 forming a node, and wherein upon a failure of the first access point 406a initiates the first point-of-sale device 410a to attempt a connection through the wireless network module to the gateway through the wireless network module on the second point-of-sale device 410b that is in communication with the second access point 410a.

Figure 5:
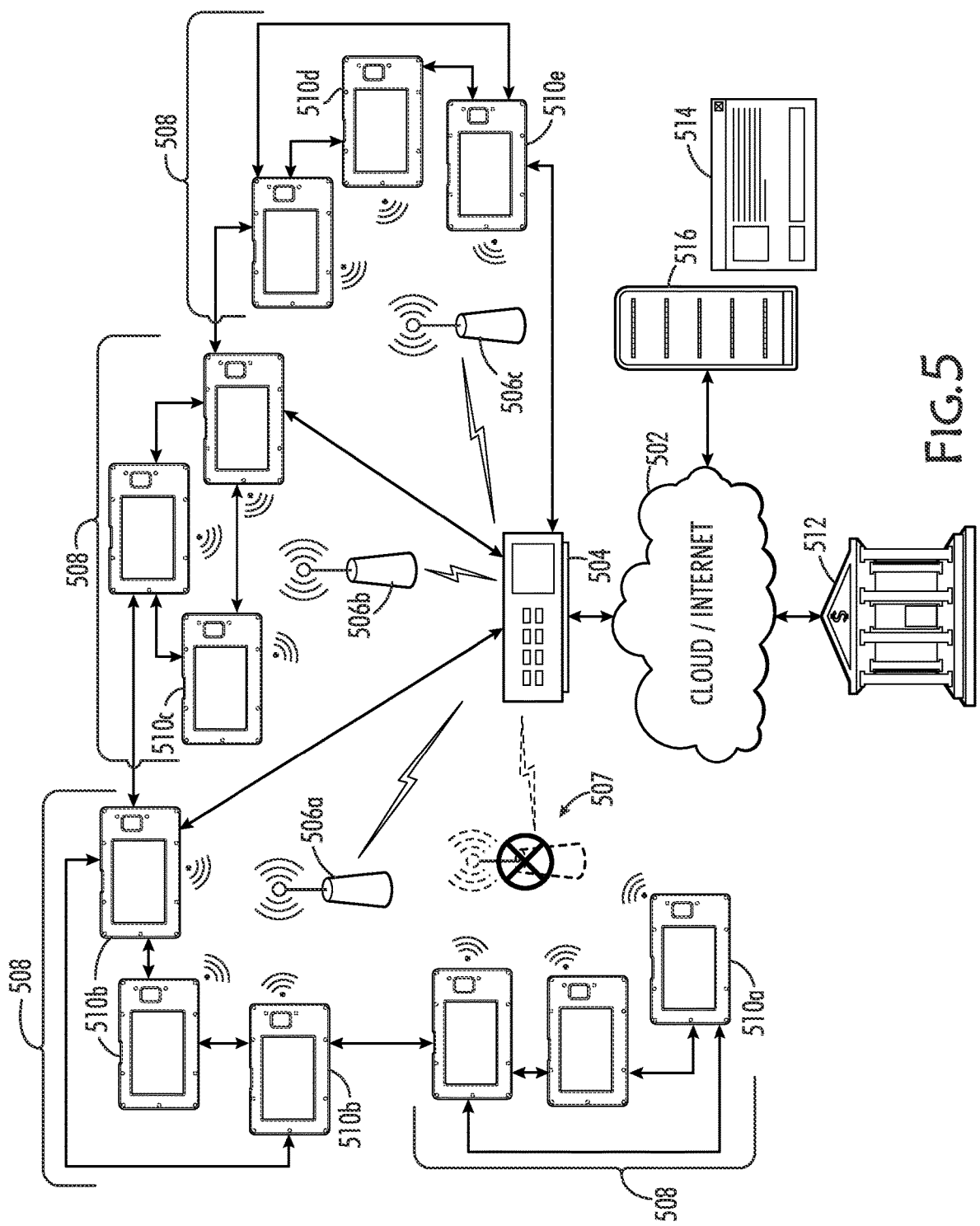
FIG. 5 is an illustration of an example network failure of an access point in the systems and methods described herein.

FIG. 5 is an illustration of an example network failure of an access point in the systems and methods described herein. In this aspect, a method is disclosed for clearing a financial transaction at an event environment when an access point fails. The method comprises providing a first point-of-sale device 510a wirelessly connected to a first access point 507, wherein the first access point 507 is in connection to an external network 502, typically through a gateway 504. A gateway may be a modem, and typically is a series of switches that connect to various routers or access points, and then form a centralized connection with the gateway device. Next, in the method disclosed in FIG. 5, providing a second point-of-sale device 510b that is wirelessly connected to a second access point 506b, wherein the second access point 506b is in connection to the external network 502 through a gateway 504. Then, attempting a financial transaction request on the first point-of-sale device 510a, wherein attempting transmits financial transaction data payload to the first access point 507 connected to the external network that is in communication with a financial institution. When attempting to connect to the financial institution 512 or payment processor, the point-of-sale device 510 receives a failure or no response to the financial transaction. This is due to the wireless access point 507 being disconnected/failing to communicate to a gateway 504 and then to the internet 502. This failure may be related to software or hardware, and is prone to happening in event environments. When presented with a network failure, the point-of-sale device may activate and connect through a mesh network to the second point-of-sale device 510b, wherein the second point-of-sale device 510b has network connection to the external network 502 through the second access point 506a. Once connected to the financial institution 512, then processing the financial transaction request by transmitting the financial transaction data payload through the first point-of-sale device 510a to the second point-of-sale device 510b, wherein the second point-of-sale device 510b transmits the financial transaction data payload through the second access point 506a to the financial institution. This method may also comprise receiving by the second point-of-sale device 510b from the financial institution 512, approval of the financial transaction request, which authorizes the transaction and completes a sale. The foregoing method may be applied to sponsor funds, wherein a cloud server 516 may reconcile the sponsor funds based on a ledger. This allows pre-loaded funds to be processed on the same dual network setup, allowing for events to offer preloaded fund cards and other alternative forms of payment.

Figure 6:
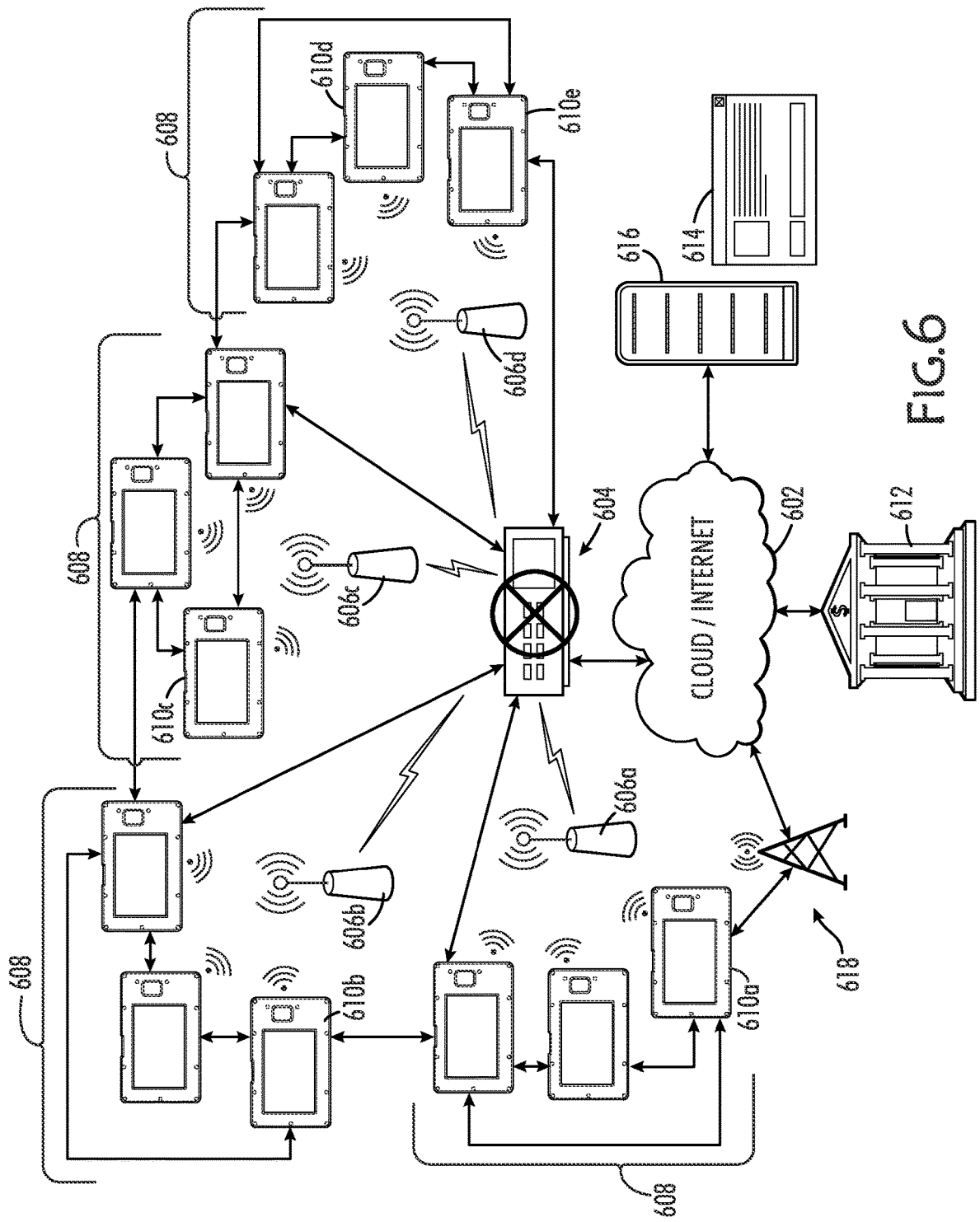
FIG. 6 is an illustration of an example network failure of a modem or gateway connecting device in accordance with the systems and methods described herein.

Referring now to FIG. 6, an illustration of an example network failure of a gateway 604 or modem in accordance with the systems and methods described herein. In this aspect the gateway 604 may become disconnected from the internet 602, thus the traditional WLAN network and the mesh network may fail to connect to the financial institution 612. In this aspect, a cellular modem on the first point-of-sale device 610 may be activated and connected to a cellular network 618, which in turn may reach the Internet 602. In this aspect, the P2P or node to node connected mesh network may propagate instructions across the various services areas 608, until it connects to the first point-of-sale device 610a, wherein it communicates across the cellular network 618 to the Internet 602 and then to a financial intuition 612 or a server 616 for clearing the transaction.

Further aspects include configuring the mesh network to activate on a cellular network, in turn allowing the plurality of point-of-sale devices to transmit instructions to those devices that are in working communication with the internet 602. Additional aspects allow the collection of business intelligence across the mesh network, wherein the business intelligence may be stored locally as a structured data set on each point-of-sale device, and then propagated to the server 616 when the event is over so as to not overload the network. In further aspects, the information and business intelligence may be transferred in real time to aid in operational activities of the dual networked point of sale system.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

It should be emphasized that the above-described embodiments of the present disclosure are merely possible examples of implementations set forth for a clear understanding of the principles of the disclosure. Many variations and modifications may be made to the above-described embodiments without departing substantially from the scope and principles of the disclosure. All such modifications and variations are intended to be included herein within the scope of this disclosure and protected by the following claims.

The disclosure herein may be further viewed as the following Implementations:

Clause 1. A dual networked point-of-sale system for operating in event environments, comprising: a plurality of point-of-sale devices, each point-of-sale device comprising a computing device, a payment device, and a wireless network module, integrated within a shell; a wireless local area network, comprising: (i) a first access point in wireless communication with a first point-of-sale device from of the plurality of point-of-sale devices; (ii) a second access point in wireless communication with a second point-of-sale device from the plurality of point-of-sale devices; (iii) a router in wired or wireless communication with the first access point and the second access point that allows the first point-of-sale device and the second point-of-sale device to communicate with a financial institution; and a mesh network, comprising: (i) each of the plurality of point-of-sale devices forming a node, and wherein upon a failure of the first access point initiates the first point-of-sale device to attempt a connection through the wireless network module to the router through the wireless network module on the second point-of-sale device that is in communication with the second access point.

Clause 2. The system of clause 1, wherein frequencies on each of the wireless network modules could operate on any of ISM band frequencies of 4.33 GHz, 915 MHz, 2.4 GHz to 5 GHz.

Clause 3. The system of clause 1, wherein each of the wireless network modules further comprises transmit power of up to 20 dBm (decibel-milliwatts).

Clause 4. The system of clause 1, wherein the shell is a polymeric shell with IP55 water resistance and dust resistance.

Clause 5. The system of clause 1, further comprising a plurality of access points.

Clause 6. The system of clause 1, further comprising a software application in memory on the each of the plurality of point-of-sale devices.

Clause 7. The system of clause 6, wherein the software application comprises instructions for transmitting a financial transaction through the mesh network to the financial institution for clearing the financial transaction.

Clause 8. The system of clause 6, wherein the software application further maintains a data repository of sponsor funds, and settles the sponsor funds through the mesh network.

Clause 9. A dual networked point-of-sale method for operating at an event environment, comprising: providing a plurality of point-of-sale devices, each point-of-sale device comprising a computing device, a payment device, and a wireless network module, integrated within a shell; establishing a wireless local area network at an event environment, comprising: (i) a first access point in wireless communication with a first point-of-sale device from of the plurality of point-of-sale devices; (ii) a second access point in wireless communication with a second point-of-sale device from the plurality of point-of-sale devices; (iii) a router in wired or wireless communication with the first access point and the second access point that allows the first point-of-sale device and the second point-of-sale device to communicate with a financial institution; and establishing a mesh network at the event environment, comprising: (i) each of the plurality of point-of-sale devices forming a node, and wherein upon a failure of the first access point initiates the first point-of-sale device to attempt a connection through the wireless network module to the router through the wireless network module on the second point-of-sale device that is in communication with the second access point.

Clause 10. The method of clause 9, wherein frequencies on each of the wireless network modules could operate on any of ISM band frequencies of 4.33 GHz, 915 MHz, 2.4 GHz to 5 GHz.

Clause 11. The method of clause 9, wherein each of the wireless network modules further comprises transmit power of up to 20 dBm (decibel-milliwatts).

Clause 12. The method of clause 9, wherein the shell is a polymeric shell with IP55 water resistance and dust resistance.

Clause 13. The method of clause 9, further comprising providing a plurality of access points.

Clause 14. The method of clause 9, further comprising installing a software application in memory on the each of the plurality of point-of-sale devices.

Clause 15. The method of clause 14, wherein the software application comprises instructions for transmitting a financial transaction through the mesh network to the financial institution for clearing the financial transaction.

Clause 16. The method of clause 14, wherein the software application further maintains a data repository of sponsor funds, and settles the sponsor funds through the mesh network.

Clause 17. A method for clearing a financial transaction at an event environment when an access point fails, comprising: providing a first point-of-sale device wirelessly connected to a first access point, wherein the first access point is in connection to an external network; providing a second point-of-sale device wirelessly connected to a second access point, wherein the second access point is in connection to the external network; attempting a financial transaction request on the first point-of-sale device, wherein attempting transmits financial transaction data payload to the first access point connected to the external network that is in communication with a financial institution; receiving a failure or no response to the financial transaction; connecting through a mesh network to the second point-of-sale device, wherein the second point-of-sale network has connection to the external network through the second access point; and processing the financial transaction request by transmitting the financial transaction data payload through the first point-of-sale device to the second point-of-sale device, wherein the second point-of-sale device transmits the financial transaction data payload through the second access point to the financial institution.

Clause 18. The method of clause 17, further comprising receiving by the second point-of-sale device from the financial institution, approval of the financial transaction request;

Clause 19. The method of clause 18, further comprising providing a third point-of-sale device wirelessly connected to a third access point, wherein the third access point is in connection to the external network;

Clause 20. The method of clause 18, further comprising processing the financial transaction request by transmitting the financial transaction data payload through the first point-of-sale device to the second point-of-sale device, and then to the third point-of-sale device, wherein the third point-of-sale device transmits the financial transaction data payload through the third access point to the financial institution.

Therefore, the following is claimed:

1. A dual networked point-of-sale system for operating in event environments, comprising:
    a plurality of point-of-sale devices, each point-of-sale device comprising a computing device, a payment device, and a wireless network module, integrated within a shell, a software application stored in memory on each of the plurality of point-of-sale devices;
    a wireless local area network, comprising a plurality of access points, the wireless local area network comprising:
        (i) a first access point in wireless communication with a first point-of-sale device from of the plurality of point-of-sale devices;
        (ii) a second access point in wireless communication with a second point-of-sale device from the plurality of point-of-sale devices; and
        (iii) a gateway in wired or wireless communication with the first access point and the second access point that allows the first point-of-sale device and the second point-of-sale device to communicate with a financial institution; and
    a mesh network, comprising:
        (i) each of the plurality of point-of-sale devices forming a node, and
        (ii) wherein a first point-of-sale device detects a failure of the first access point in response to a failure response or no response to a transaction, wherein the software application comprises instructions for transmitting the transaction through the mesh network to the financial institution for clearing the transaction, and in response to detecting the failure of the first point-of-sale device activates the mesh network to attempt a connection through the wireless network module to the gateway through the wireless network module on the second point-of-sale device that is in communication with the second access point.

2. The system of claim 1, wherein bandwidth on each of the wireless network modules is a 900 MHz frequency band, ranging from 902 MHz to 928 MHz.

3. The system of claim 1, wherein frequencies on each of the wireless network modules could operate on any of ISM band frequencies of 4.33 GHZ, 915 MHz, 2.4 GHz to 5 GHz.

4. The system of claim 1, wherein the shell is a polymeric shell with IP55 water resistance and dust resistance.

5. The system of claim 1, wherein the software application further maintains a data repository of sponsor funds, and settles the sponsor funds through the mesh network.

6. The system of claim 1, wherein the first point-of-sale device is further configured to detect a failure of the gateway in response to another failure response or no response to the transaction, and in response to detecting the failure of the gateway the first point-of-sale device activates a cellular modem and connects to a cellular network, wherein the cellular network allows the first point-of-sale device to communicate with the financial institution.

7. A dual networked point-of-sale method for operating at an event environment, comprising:
   providing a plurality of point-of-sale devices, each point-of-sale device comprising a computing device, a payment device, and a wireless network module, integrated within a shell, a software application stored in memory on each of the plurality of point-of-sale devices;
   establishing a wireless local area network at an event environment, comprising a plurality of access points, the wireless local area network comprising:
     (i) a first access point in wireless communication with a first point-of-sale device from of the plurality of point-of-sale devices;
     (ii) a second access point in wireless communication with a second point-of-sale device from the plurality of point-of-sale devices; and
     (iii) a gateway in wired or wireless communication with the first access point and the second access point that allows the first point-of-sale device and the second point-of-sale device to communicate with a financial institution; and
   establishing a mesh network at the event environment, comprising:
   (i) each of the plurality of point-of-sale devices forming a node, and
   (ii) wherein a first point-of-sale device detects a failure of the first access point in response to a failure response or no response to a transaction, wherein the software application comprises instructions for transmitting the transaction through the mesh network to the financial institution for clearing the transaction, and in response to detecting the failure of the first point-of-sale device activates the mesh network to attempt a connection through the wireless network module to the gateway through the wireless network module on the second point-of-sale device that is in communication with the second access point.

8. The method of claim 7, wherein bandwidth on each of the wireless network modules is a 900 MHz frequency band, ranging from 902 MHz to 928 MHz.

9. The method of claim 7, wherein frequencies on each of the wireless network modules could operate on any of ISM band frequencies of 4.33 GHZ, 915 MHz, 2.4 GHz to 5 GHz.

10. The method of claim 7, wherein the software application further maintains a data repository of sponsor funds, and settles the sponsor funds through the mesh network.

11. A method for clearing a financial transaction at an event environment when an access point fails, comprising:
   providing a first point-of-sale device of a plurality of point-of-sale-devices, the first point-of-sale device wirelessly connected to a first access point via a wireless network comprising a plurality of access points, wherein the first access point is in connection to an external network;
   providing a second point-of-sale device of the plurality of point-of-sale devices, the second point-of-sale device wirelessly connected to a second access point, wherein the second access point is in connection to the external network, wherein a software application is stored in memory on the each of the plurality of point-of-sale devices;
   attempting a financial transaction request on the first point-of-sale device, wherein attempting transmits financial transaction data payload to the first access point connected to the external network that is in communication with a financial institution;
   receiving a failure or no response to the financial transaction;
   detecting a failure of the first access point in response to the failure or no response to the financial transaction;
   in response to detecting the failure the first point-of-sale device, activating and connecting through a mesh network to the second point-of-sale device, wherein the second point-of-sale device has connection to the external network through the second access point, wherein the software application comprises instructions for transmitting the financial transaction through the mesh network to the financial institution for clearing the financial transaction; and
   processing the financial transaction request by transmitting the financial transaction data payload through the first point-of-sale device to the second point-of-sale device, wherein the second point-of-sale device transmits the financial transaction data payload through the second access point to the financial institution.

12. The method of claim 11, further comprising receiving by the second point-of-sale device from the financial institution, approval of the financial transaction request.

13. The method of claim 12, further comprising providing a third point-of-sale device wirelessly connected to a third access point, wherein the third access point is in connection to the external network.

14. The method of claim 12, further comprising processing the financial transaction request by transmitting the financial transaction data payload through the first point-of-sale device to the second point-of-sale device, and then to a third point-of-sale device, wherein the third point-of-sale device transmits the financial transaction data payload through a third access point to the financial institution.

\* \* \* \* \*